(12) United States Patent
Kaminsky

(10) Patent No.: US 12,060,820 B2
(45) Date of Patent: Aug. 13, 2024

(54) PROCESSES FOR REMOVING CARBON DIOXIDE FROM EXHAUST GAS USING SCRAPED AND NON-SCRAPED HEAT EXCHANGERS

(71) Applicant: ExxonMobil Technology and Engineering Company, Annandale, NJ (US)

(72) Inventor: Robert D. Kaminsky, Houston, TX (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 560 days.

(21) Appl. No.: 17/196,590

(22) Filed: Mar. 9, 2021

(65) Prior Publication Data
US 2021/0293165 A1 Sep. 23, 2021

Related U.S. Application Data

(60) Provisional application No. 62/991,822, filed on Mar. 19, 2020.

(51) Int. Cl.
*F01N 3/02* (2006.01)
*F01D 5/18* (2006.01)

(52) U.S. Cl.
CPC ........... *F01N 3/0205* (2013.01); *F01D 5/187* (2013.01); *F01N 2240/02* (2013.01); *F05D 2260/205* (2013.01)

(58) Field of Classification Search
CPC .... F01N 3/0205; F01N 2240/02; F01D 5/187; F05D 2260/205; B01D 2257/504;
(Continued)

(56) References Cited

U.S. PATENT DOCUMENTS

| 3,905,784 A * | 9/1975 | Kelleher ............... F01N 3/0205 |
| | | 210/756 |
| 11,725,584 B2 * | 8/2023 | Niergarth ................. F02C 7/14 |
| | | 60/806 |

(Continued)

FOREIGN PATENT DOCUMENTS

| JP | S6140808 A | 2/1986 |
| JP | 5518531 B | 6/2014 |
| WO | 2011/140117 A | 11/2011 |

OTHER PUBLICATIONS

Aaron, D., et al., "Separation of CO.sub.2 from Flue Gas: A Review," Separation Science and Technology, 40, pp. 321-348, 2005.

*Primary Examiner* — Kenneth J Hansen
*Assistant Examiner* — Kelsey L Stanek
(74) *Attorney, Agent, or Firm* — Shook, Hardy & Bacon L.L.P.

(57) ABSTRACT

Improved processes and systems for removing $CO_2$ from exhaust gas to substantially prevent such greenhouse gas from being released to the atmosphere. The systems and processes use a) staged cooling of an exhaust gas stream, b) addition of an antifreeze, and c) a combination of non-scraped heat exchangers and scraped heat exchangers to separate $CO_2$ from an exhaust stream while reducing or minimizing accumulation of ice on surfaces within the system.

19 Claims, 2 Drawing Sheets

(58) Field of Classification Search
CPC .... B01D 9/0013; B01D 53/62; F25J 2205/20; F25J 2210/70; F25J 2280/40; F25J 3/067; F25J 2205/40; Y02C 20/40; Y02C 20/32
USPC ..................................... 95/156; 62/601, 602
See application file for complete search history.

(56) References Cited

U.S. PATENT DOCUMENTS

| | | | | |
|---|---|---|---|---|
| 2010/0236408 | A1* | 9/2010 | Asprion | B01D 53/62 |
| | | | | 95/183 |
| 2011/0265512 | A1* | 11/2011 | Bearden | B01D 53/002 |
| | | | | 62/617 |
| 2012/0297821 | A1* | 11/2012 | Baxter | F25J 3/067 |
| | | | | 62/617 |
| 2013/0074541 | A1* | 3/2013 | Kaminsky | B01D 53/002 |
| | | | | 62/601 |
| 2015/0068398 | A1* | 3/2015 | Chinn | B01D 53/1456 |
| | | | | 95/232 |

* cited by examiner

PROCESSES FOR REMOVING CARBON DIOXIDE FROM EXHAUST GAS USING SCRAPED AND NON-SCRAPED HEAT EXCHANGERS

PRIORITY

This application claims priority to and the benefit of U.S. Provisional Application No. 62/991,822, filed Mar. 19, 2020, the disclosure of which is incorporated herein by reference in its entirety.

FIELD

Embodiments of the present invention generally relate to removing $CO_2$ from exhaust gas, and more particularly to processes for removing $CO_2$ from exhaust gas using both scraped and non-scraped heat exchangers.

BACKGROUND

Global warming resulting from the emissions of greenhouse gases such as $CO_2$ has become an important environmental concern. A large portion of $CO_2$ emissions are released from power plants all over the world. The $CO_2$ is commonly found in the exhaust gas from gas turbines, boilers, and fired heaters found in such power plants. This exhaust gas can be released to the atmosphere through a pipe or channel known as a flue and thus is also known as "flue gas".

To mitigate global warming caused by $CO_2$ emissions, various processes have been developed to remove $CO_2$ from exhaust gas. Such processes involve amine or ammonia treating of the gas stream, adsorbing the $CO_2$ with a solid adsorbent, and removing the $CO_2$ using physical solvents. Illustrative examples of these processes are disclosed in D. Aaron and C. Tsouris, "Separation of CO.sub.2 from Flue Gas: A Review," Separation Science and Technology, 40, 321-48, 2005.

These conventional processes, while effective at $CO_2$ removal, tend to be very costly because they typically have high energy and solvent requirements and may require high pressures to operate effectively. For example, in coal-fired power plants, removal of $CO_2$ from exhaust gas using an amine-treating process is estimated to reduce the net power generation by approximately 30%. Another problem with using amines for $CO_2$ removal is that the amines can absorb particulates and other materials in the gas stream such as sulfur, making the amines less effective at removing $CO_2$. Using amines also has the drawback that water in the gas stream can dilute the amines and thus reduce the effectiveness of the amines even more. To avoid dilution of the amines, water in the gas stream is often removed before exposing the stream to the amines. This dehydration of the gas stream increases the cost of the amine-treating process even more. Moreover, the cost effectiveness of the amine-treating process undesirably decreases as the scale of the process is reduced.

A need therefore exists for a more cost effective process of removing $CO_2$ from exhaust gas without being concerned that the process will become less effective over time. Also, a $CO_2$ removal process is desired that does not become less cost effective as the scale of the process decreases.

SUMMARY

Improved processes and systems for removing $CO_2$ from exhaust gas to substantially prevent such greenhouse gas from being released to the atmosphere are disclosed herein. In one or more embodiments, a process for removing $CO_2$ from a gas can include introducing a gas stream comprising $CO_2$ to a non-scraped heat exchanger to cool the gas stream to a first temperature greater than about 0° C. and less than about 10° C., introducing an antifreeze agent to the gas stream downstream from the non-scraped heat exchanger to form a mixed stream, introducing the mixed stream to at least one other non-scraped heat exchanger to cool the mixed stream to a second temperature greater than a freezing temperature of the mixed stream, thereby forming a cooled mixed stream, and introducing at least a portion of the cooled mixed stream to a scraped heat exchanger to cool the cooled mixed stream to a third temperature below which solid $CO_2$ forms.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
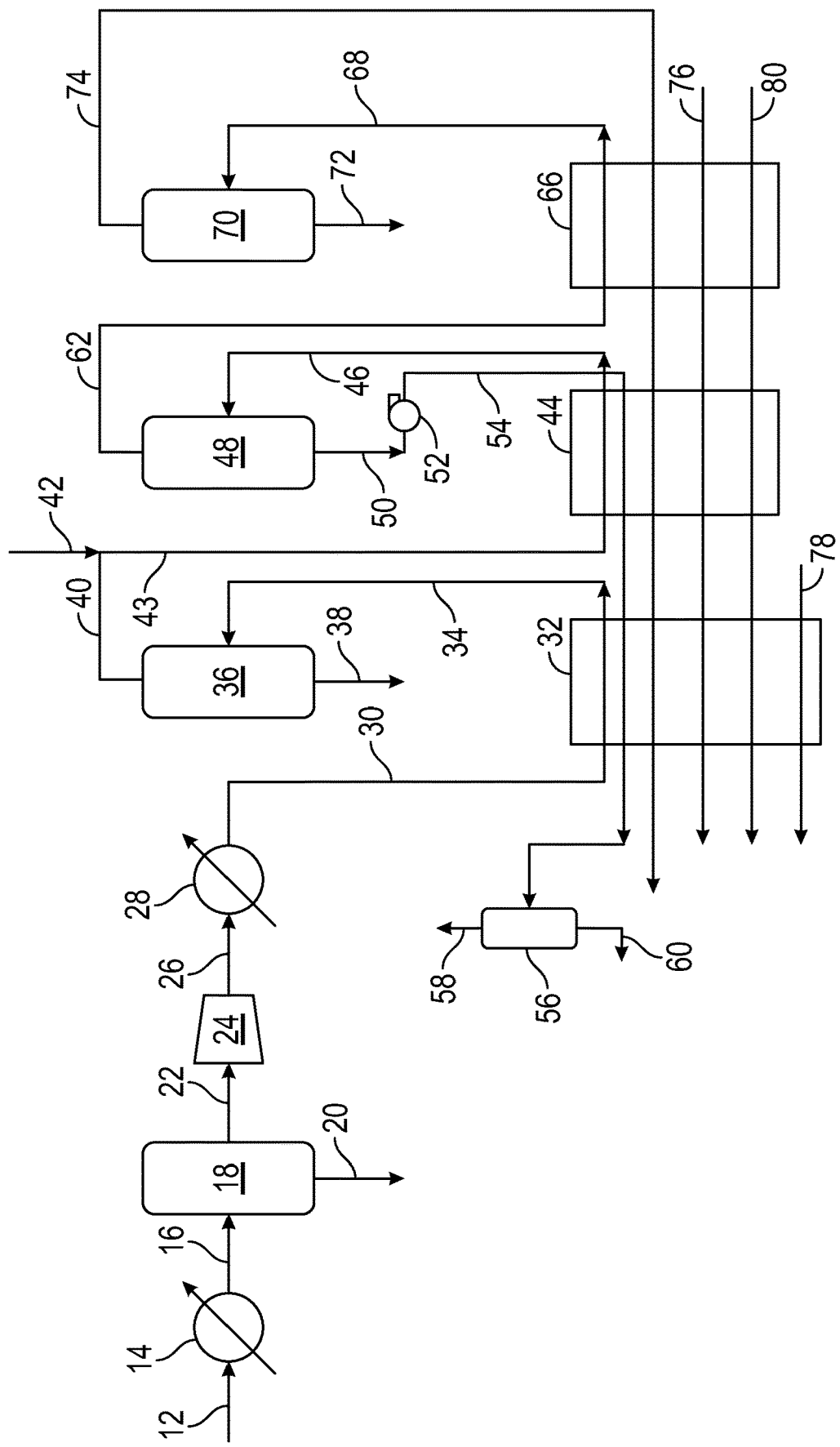
FIG. 1 depicts a flow diagram of an illustrative process for removing $CO_2$ from an exhaust gas using scraped and non-scraped heat exchangers, according to one or more embodiments described herein.

Improved processes and systems for removing $CO_2$ from exhaust gas to substantially prevent such greenhouse gas from being released to the atmosphere are provided herein. The systems and processes use a) staged cooling of an exhaust gas stream, b) addition of an antifreeze, and c) a combination of non-scraped heat exchangers and scraped heat exchangers to separate $CO_2$ from an exhaust stream while reducing or minimizing accumulation of ice on surfaces within the system.

In various aspects, a gas stream including the $CO_2$ can be introduced to a non-scraped heat exchanger to cool the stream to a temperature just above water ice formation, e.g., greater than 0° C. and less than 10° ° C. An antifreeze agent can then be introduced to the cooled gas stream before sending the resulting mixed stream to at least one other non-scraped heat exchanger to cool the mixed stream to a temperature near to but above a temperature at which the mixed stream freezes, e.g., greater than the highest temperature at which solids freeze out of a vapor phase or a liquid phase of the mixed stream and less than 15° C. above this freezing temperature. After the $CO_2$-containing stream passes through each non-scraped heat exchanger, liquids can be removed from the stream and an antifreeze agent can be added to the stream. The $CO_2$-containing stream can then be introduced to a scraped heat exchanger to cool the stream to a temperature below which solid $CO_2$ forms. This solid $CO_2$ can be separated from the stream and heated to form a $CO_2$ rich fluid stream that can be utilized in other processes recognizable by one skilled in the art.

As used herein, the term "scraped heat exchanger" refers to a heat exchanger that includes an internal mechanism (e.g., a rotating cylinder from which blades extend) for scraping material from at least one surface of the heat exchanger, whereas the term "non-scraped heat exchanger" refers to a heat exchanger that does not include such an internal mechanism. The term "antifreeze agent" refers to a material that can be added to another material to lower its highest freezing point temperature, which is typically due to the freezing of water in the system.

Due to the absence of mechanical parts for inhibiting or removing fouling, non-scraped heat exchangers are significantly cheaper than scraped heat exchangers. Thus, by feeding the $CO_2$-containing gas to one or more non-scraped heat exchangers prior to sending it to a non-scraped heat exchanger, the size and thus the cost of the scraped heat exchanger can be minimized. Consequently, the costs and physical size of the $CO_2$ removal processes disclosed herein are much lower than if only scraped heat exchangers were employed.

The $CO_2$ removal processes provided herein advantageously have less energy requirements and can be operated at lower pressures than conventional $CO_2$ removal processes. Additionally, the $CO_2$-containing gas does not need to be strongly dehydrated before being introduced to the heat exchangers, and costly solvents are typically not required for the $CO_2$ removal. As such, the processes disclosed herein can be less expensive than conventional processes. Another advantage of these processes is that their cost effectiveness is less likely to decrease as the amount of $CO_2$-containing gas being processed decreases. In fact, the smaller the scale of these processes, the higher the cost effectiveness can be because the sizes of the heat exchangers can be reduced. Moreover, these processes usually do not suffer from the disadvantage of becoming less effective over time as a result of the absorption of contaminants.

Staged Cooling and Addition of Antifreeze

In various aspects, staged cooling and addition of antifreeze can be used to reduce or minimize ice (i.e, frozen water) formation within a system for separating $CO_2$ from an exhaust stream. The systems and methods can involve the use of a plurality of stages. The exhaust gas stream can originate, for example, in a power plant and thus can be produced by any convenient type of power generation equipment, such as a gas turbine, a fired heater, or a boiler. By way of example, the $CO_2$ content of the exhaust gas can be roughly 2 mol % to 6 mol % from a gas turbine, 10 mol % to 15 mol % from a fired heater, and 10 mol % to 15 mol % from a boiler. The exhaust gas stream can also include other gases such as $N_2$ and water vapor.

In an initial cooling stage, an exhaust gas stream that includes $CO_2$ can be fed to at least one cooler to cool the gas stream with ambient-available air or water to a temperature within 20° C. of ambient temperature or within 10° C. of ambient temperature. Minimizing temperature without causing freezing using ambient-available air or water is desirable to reduce refrigeration energy in the later units described below. However, practical issues about cooler size and cost will generally limit the cooling amount to be within the previously stated ranges. As used herein, the term "ambient" refers to the environment surrounding the system or process being described. Typically, ambient temperature is about 5° C. to 30° C., depending on the weather in the surrounding environment.

The cooler can condense a portion of the water in the gas stream. The resulting cooled gas stream can then be directed to a separator for removing the condensed water therefrom.

Next, the gas stream with reduced water content that exits separator can be passed to at least one compressor or blower in series with at least one additional cooler. The compressor can slightly compress the gas stream with reduced water content. This increase in pressure can be sufficient to allow the gas stream to flow through the remaining portions of the process flow. By way of example, the gas stream with reduced water content can be compressed from near-ambient pressure of 95 kPa-a to 110 kPa-a, or 100 kPa-a to 110 kPa-a, to a pressure of 120 kPa-a to 150 kPa-a, or 130 kPa-a to 180 kPa-a. In other aspects, the pressure can be as low as feasible to achieve the desired flow rate through the piping and equipment so as to minimize cost. The temperature of the compressed gas stream can be lowered by an additional cooler to a temperature within 20° C. of ambient temperature or within 10° C. of ambient temperature.

After the initial cooling and compression stage, the cooled, compressed gas stream can be introduced to a first non-scraped heat exchanger to cool the gas stream to a temperature just above the temperature for ice formation from substantially pure water. In some aspects, the gas stream can be cooled to a temperature greater than 0.0° C. and/or less than 10.0° ° C. For example, the gas stream can be cooled in the first non-scraped heat exchanger to a temperature of 0.0° ° C. to 10.0° C., or 0.5° C. to 10.0° C., or 0.5° C. to 5.0° C., or 1.5° C. to 5.0° C., or 0.5° C. to 2.5° C., or 1.5° C. to 2.5° C. In some aspects, the temperature is as close to the freezing point of water (0° C.) as possible without risking the formation of ice that could undesirably block passageways in the system. The amount of water vapor remaining in a first effluent stream leaving the first heat exchanger can be less than about 5 vol %.

The first effluent stream flowing out of the first heat exchanger can then be routed to a first heat exchanger separation stage to remove condensed water from a remaining portion of the first effluent stream. A first portion of an antifreeze agent can then be added to the first effluent stream to reduce, minimize, or eliminate water ice formation in the resulting mixed stream containing the first effluent stream and antifreeze. The antifreeze agent can be or can include one or more alcohols such as methanol or ethanol, with methanol being preferred. The amount of antifreeze agent added to the mixed stream results in 20 vol % to 98 vol %, or 20 vol % to 75 vol %, or 30 vol % to 85 vol %, or 40 vol % to 98 vol % of antifreeze agent in the mixed stream, wherein vol % is based on the total volume of liquid present in the mixed stream at the lowest temperature to inhibit freezing. The total volume of liquid includes both liquid condensed from the gas stream and liquid from the antifreeze.

The mixed stream containing the remaining portion of the first effluent stream and the first portion of the antifreeze agent can then be sent to at least one additional or secondary non-scraped heat exchanger. In some aspects, a single stage of additional or secondary non-scraped heat exchanger(s) can be used. In such aspects, the additional or secondary non-scraped heat exchanger stage can cool the mixed stream to produce a secondary effluent having a temperature greater than but near the freezing temperature of the mixed stream. In some aspects, the additional or secondary non-scraped heat exchanger stage can cool the mixed stream to form a secondary effluent having a temperature less than −95° C. and greater than −120° C. For example, the secondary effluent can have a temperature of −95° C. to −120° C., or −105° C. to −120° C., or −95° C. to −110° C. In some aspects, this temperature is as close to the freezing point of the mixed stream as possible without risking the formation of ice that could undesirably block passageways in the system. By reducing or minimizing the temperature of the secondary effluent, the demands on, and hence the size of, downstream heat exchangers, such as the scraped heat exchanger, can be reduced. It is recognized that the freezing temperature of the mixed stream can vary depending on the partial pressure of the freezing component in the vapor phase of the mixed stream and thus, for example, the concentration of the $CO_2$ present in the original gas stream.

In other aspects, a plurality of secondary heat exchanger stages can be used. In such alternative aspects, one or more intermediate effluents can be generated with temperatures between 0° C. and −100° ° C. For example, if there are two secondary heat exchanger stages, an intermediate effluent can be generated with a temperature between −30° C. and −60° C., or between −40° C. to −60° C. Optionally, a separator can be used to remove water from each intermediate effluent prior to passing the intermediate effluent to the next heat exchanger stage. It is noted that once antifreeze has been added to the mixed stream, removal of water can also result in removal of some antifreeze. Optionally, additional portions of antifreeze can be added to the mixed stream prior to passing the intermediate effluent into the next heat exchanger stage.

As a result of the cooling in the secondary heat exchanger stages, any water vapor remaining in the effluent from the final secondary non-scraped heat exchanger can be condensed. This condensed water can also include a portion of the antifreeze from the mixed stream. Additionally, the condensed water and antifreeze from the final secondary heat exchanger stage can also include some $CO_2$. In some aspects, this $CO_2$ entrained or dissolved in the condensed water and antifreeze can be recovered by compressing the condensed water and antifreeze to form a compressed, higher temperature water and antifreeze stream. A distillation column can then be used to separate $CO_2$, a gas under such conditions, from the water and antifreeze, which are liquid under the conditions. Optionally, a heat exchanger can be used to recover heat from the stream prior to distillation. Optionally, the antifreeze can be recovered and recycled for further use. The $CO_2$ off-gas stream from the distillation column can be recycled to the power plant for various purposes unless its quantity is small enough to be vented. One example of how the $CO_2$ off-gas could be used is to cool the rotating blades of a gas turbine in the power plant. Alternatively, the $CO_2$ off-gas could be captured and sequestered.

The final mixed stream can then be introduced to a scraped heat exchanger stage to cryogenically remove or freeze out the $CO_2$ from the final mixed stream. In various aspects, the scraped heat exchanger can cool the final mixed stream to a temperature below which solid $CO_2$ forms, thereby forming a partially frozen mixed stream. This temperature can range from −115° C. to −140° C., or −120° C. to −135° C. It is recognized that this temperature can vary depending on the desired amount of $CO_2$ removal. While a colder temperature can remove more $CO_2$, it requires more cooling capacity from the scraped heat exchanger. Thus, a balance exists between the amount of $CO_2$ removed and the cost of power to cool the scraped heat exchanger.

Next, the partially frozen mixed stream that exits scraped heat exchanger can be routed to a separator to separate solid $CO_2$ from the partially frozen mixed stream. This solid $CO_2$ can be heated to a temperature sufficient to form a $CO_2$ rich gas stream that can be recycled to the power plant for various reasons such as for cooling the rotating blades of a gas turbine. After separating solid $CO_2$ from the partially frozen mixed stream, the remainder of the stream can correspond to a gas stream that contains little or no $CO_2$. This remaining gas stream can be vented to the atmosphere with substantially reduced $CO_2$ content compared to the original gas stream, for example, less than 50%, 75%, or 90% of the amount of $CO_2$ in the original gas stream. Optionally, the remaining gas stream can also be passed through one or more heat exchangers to serve as a cooling medium prior to being vented.

Suitable heat exchanger types are commonly known in the art such as plate heat exchangers, double pipe heat exchangers, and shell and tube heat exchangers. Preferably, multi-pass heat exchangers are used to allow for maximum cooling efficiency. Also, it is preferred to choose a heat exchanger design with a relatively high surface area that allows for small minimum approach temperatures between the cooling medium and the gas stream that is being cooled while also being reasonably sized and having a small pressure drop across the heat exchangers.

One or more cooling mediums or refrigerants can pass through the heat exchangers countercurrently to the gas streams being cooled. In one or more embodiments, dual mixed cooling mediums can be employed in the $CO_2$ removal process. In particular, a first cooling medium can primarily include methane mixed with other components. For example, the first cooling medium can include greater than about 70 mol % of methane (C1), ethane (C2), and $N_2$ combined and greater than about 10 mol % of C4+ alkanes (i.e., alkanes with 4 or more carbon atoms) combined. Preferably, the first cooling medium includes about 40 mol % to about 60 mol % of C1 and about 18 mol % to about 40 mol % of C2. In one embodiment, the first cooling medium can include about 47 mol % of C1, 30 mol % of C2, 4 mol % of $N_2$, 14 mol % of nC4, and 5 mol % of nC5 (normal pentane).

A second cooling medium that is warmer than the first cooling medium can also be passed through one or more of the non-scraped heat exchangers to assist the first cooling medium by improving the overall cooling efficiency of the non-scraped heat exchangers. The second cooling medium can include greater than about 70 mol % of propane (C3) and C3+ alkanes (i.e., alkanes with 3 or more carbon atoms) combined. For example, the second cooling medium can include about 40 mol % to about 60 mol % of C3 and about 30 mol % to about 60 mol % of C3+ alkanes. Preferably, the second cooling medium includes about 50 mol % of C3 and about 50 mol % of C3+ alkanes.

In another embodiment, liquefied natural gas can also serve as a cooling medium. A liquefied natural gas (LNG) stream can flow through one or more of the non-scraped heat exchangers and/or the scraped heat exchanger countercurrently to the gas streams being cooled. As a result, the LNG stream can be re-vaporized by the heat exchangers. If desired, the LNG stream can then be used as fuel in a combustion process such as a gas turbine in a power plant.

In one or more embodiments in which a gas turbine generates the $CO_2$-containing stream that is subjected to the $CO_2$ removal process provided herein, the power generated by the gas turbine can be used to refrigerate and pump the cooling mediums through the heat exchangers. As mentioned previously, the $CO_2$ rich gas stream and any $CO_2$ off-gas generated by the $CO_2$ removal process can also be used to cool the rotating blades of this gas turbine.

Definitions

It is to be understood that the following disclosure describes several exemplary embodiments for implementing different features, structures, and/or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the exemplary embodiments presented below can be combined in any combination of ways, i.e., any element from one exemplary embodiment can be used in any other exemplary embodiment, without departing from the scope of the disclosure.

Additionally, certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function.

In the following discussion and in the claims, the terms "including" and "comprising" are used in an open-ended fashion, and thus should be interpreted to mean "including, but not limited to." The phrase "consisting essentially of" means that the described/claimed composition does not include any other components that will materially alter its properties by any more than 5% of that property, and in any case does not include any other component to a level greater than 3 mass %.

The term "or" is intended to encompass both exclusive and inclusive cases, i.e., "A or B" is intended to be synonymous with "at least one of A and B," unless otherwise expressly specified herein.

The indefinite articles "a" and "an" refer to both singular forms (i.e., "one") and plural referents (i.e., one or more) unless the context clearly dictates otherwise. For example, embodiments using "an antifreeze agent" include embodiments where one, two, or more antifreeze agents are used, unless specified to the contrary or the context clearly indicates that only one olefin is used.

The term "wt %" means percentage by weight, "vol %" means percentage by volume, "mol %" means percentage by mole, "ppm" means parts per million, and "ppm wt" and "wppm" are used interchangeably and mean parts per million on a weight basis. All concentrations herein, unless otherwise stated, are expressed on the basis of the total amount of the composition in question.

Nomenclature of elements and groups thereof used herein are pursuant to the Periodic Table used by the International Union of Pure and Applied Chemistry after 1988. An example of the Periodic Table is shown in the inner page of the front cover of Advanced Inorganic Chemistry, 6th Edition, by F. Albert Cotton et al. (John Wiley & Sons, Inc., 1999).

Configuration Example

Turning now to the drawings, FIG. 1 depicts an illustrative $CO_2$ removal process in accordance with one or more embodiments disclosed herein. First, an exhaust gas stream 12 that includes $CO_2$ can be fed to at least one cooler 14 to cool the gas stream 12 with ambient temperature air or water. The exhaust gas stream 12 can originate in a power plant and thus can be produced by, e.g., a gas turbine, a fired heater, or a boiler. The exhaust gas stream 12 can also include other gases such as $N_2$ and water vapor.

The cooler 14 can condense a portion of the water in gas stream 12. The gas stream 16 that exits cooler 14 can be directed to a separator 18 for removing the condensed water therefrom. Next, the gas stream 22 that exits separator 18 can be passed to at least one compressor 24 (or blower) in series with at least one cooler 28. The compressor 24 can slightly compress gas stream 22 to cause it to flow through the remaining process. By way of example, the gas stream 22 can be compressed from near-ambient pressure to an absolute pressure of about 120 to about 180 kPa. Preferably, the pressure is as low as feasible to achieve the desired flow rate through the piping and equipment so as to minimize cost. The temperature of the gas stream 26 that exits compressor 24 can be lowered by cooler 28 using air or water.

Next, a cooled gas stream 30 that exits cooler 28 can be introduced to a non-scraped heat exchanger 32 to cool the gas stream 30 to a temperature just above water ice formation. Preferably, this temperature is as close to the freezing point of water (0° C.) as possible without risking, due to the practical ability to accurately and reliability control temperature, the formation of ice that could undesirably block passageways in the system.

A cooled gas stream 34 flowing out of heat exchanger 32 can then be routed to a separator 36 to remove condensed water from the stream 30, as indicated by water stream 38 leaving the bottom of separator 36. An antifreeze agent, as shown by stream 42, can be added to the gas stream 40 that exits the top of separator 36 to prohibit water ice formation in the resulting mixed stream 43. The antifreeze agent can be or can include one or more alcohols such as methanol or ethanol, with methanol being preferred since it is more effective on a volume basis than other alcohols.

Still referring to FIG. 1, the mixed stream 43 can be sent to at least one additional non-scraped heat exchanger 44. The non-scraped heat exchanger 44 can cool the mixed stream 43 to a temperature greater than but near the freezing temperature of the mixed stream 43, e.g., less than about −95° C. and greater than about −120° C. Preferably, this temperature is as close to the freezing point of the mixed stream 43 as possible without risking the formation of ice that could undesirably block passageways in the system. By minimizing this temperature, the demands on, and hence the size of, downstream heat exchangers, such as the scraped heat exchanger, can be reduced. It is recognized that the freezing temperature of the mixed stream 43 can vary depending on the partial pressure and thus the concentration of the $CO_2$ present in the stream 43.

As a result of this cooling, nearly all of the water vapor remaining in mixed stream 43 can be condensed. A cooled gas stream 46 that exits the non-scraped heat exchanger 44 can then be sent to a separator 48 to remove the condensed water and the antifreeze from stream 46, as indicated by the liquid stream 50 leaving the bottom of the separator 48. If desired, the liquid stream 50, which can include $CO_2$ off-gas, can be further passed through a pump 52 to increase its pressure and temperature to from a compressed stream 54. This compressed stream 54 can then be introduced to a distillation column 56 to recover any $CO_2$ off-gas, as indicated by stream 58, and the antifreeze agent, as indicated by stream 60. If desired, the compressed stream 54 can be passed through heat exchangers 32 and 44 on its way to the distillation column 56 to serve as a cooling medium. The antifreeze agent recovered from the distillation column 56 can be recycled back to the $CO_2$ removal process. The $CO_2$ off-gas stream 58 can be captured for sequestration or recycled to the power plant for various purposes, unless its quantity is small enough to be vented. One example of how the $CO_2$ off-gas could be used is to cool the rotating blades of a gas turbine in the power plant.

A $CO_2$-containing gas stream 62 can exit the top of separator 48. The $CO_2$-containing gas stream 62 can be introduced to a scraped heat exchanger 66 to cryogenically remove or freeze out the $CO_2$ from the $CO_2$-containing gas stream 62. In particular, the scraped heat exchanger 66 can cool the $CO_2$-containing gas stream 62 to a temperature below which solid $CO_2$ forms. It is recognized that this temperature can vary depending on the desired amount of $CO_2$ removal. While a colder temperature can remove more $CO_2$, it requires more cooling capacity from the heat exchanger 66. Thus, a balance exists between the amount of $CO_2$ removed and the cost of power to refrigerate. At least a portion of the solid $CO_2$ formed can collect in the scraped heat exchanger 66. Alternatively or additionally, a portion of the solid $CO_2$ can be carried by gas flowing out of heat exchanger 66, as indicated by partially frozen mixed stream 68, to a separator to remove the solid $CO_2$ from the gas.

Next, the partially frozen mixed stream 68 that exits scraped heat exchanger 66 can be routed to a separator 70 to separate solid $CO_2$ from stream 68, as indicated by stream 72. In some embodiments, separator 70 may be physically integrated with scraped heat exchanger 66. This solid $CO_2$ can be heated to a temperature sufficient to form a $CO_2$ rich gas stream that can be recycled to the power plant for various reasons such as for cooling the rotating blades of a gas turbine. A gas stream 74 that exits separator 70 can contain much reduced $CO_2$ compared to the original feed gas and thus can be vented to the atmosphere with reduced $CO_2$ environmental impact. Preferably, this gas stream 74, which is quite cold, is passed through heat exchangers 32, 44, and 66 to serve as a cooling medium prior to being vented.

The non-scraped heat exchangers 32 and 44, and potentially the scraped heat exchanger 66, can be combined into one physically integrated piece of equipment. This can lead to somewhat greater efficiency of refrigerant usage but adds design complexity and hence cost. Alternatively, they can be separate heat exchangers, as shown in FIG. 1. Suitable heat exchanger types are commonly known in the art such as plate heat exchangers, double pipe heat exchangers, and shell and tube heat exchangers. Preferably, multi-pass heat exchangers are used to allow for maximum cooling efficiency. Also, it is preferred to choose a heat exchanger design with a relatively high surface area that allows for small minimum approach temperatures between the cooling medium and the gas stream that is being cooled while also being reasonably sized and having a small pressure drop across the heat exchangers.

One or more cooling mediums or refrigerants can pass through the heat exchangers 32, 44, and 66 countercurrently to the gas streams being cooled. In one or more embodiments, two multicomponent cooling mediums (i.e., a dual mixed refrigerant system) can be employed in the $CO_2$ removal process, as depicted in FIG. 1. In particular, a first cooling medium 76 can flow through heat exchangers 32, 44, and 66. The first cooling medium 76 can primarily include methane mixed with other components. For example, the first cooling medium 76 can include greater than about 70 mol % of methane (C1), ethane (C2), and $N_2$ combined and greater than about 10 mol % of C4+ alkanes. Preferably, the first cooling medium 76 includes about 40 mol % to about 60 mol % of C1 and about 18 mol % to about 40 mol % of C2. In one embodiment, the first cooling medium 76 can include about 47 mol % of C1, 30 mol % of C2, 4 mol % of $N_2$, 14 mol % of nC4, and 5 mol % of nC5.

A second cooling medium 78 that is warmer than the first cooling medium 76 can also be passed through the non-scraped heat exchanger 32 to assist the first cooling medium 76 by improving the overall cooling efficiency of the heat exchanger 32. The second cooling medium 78 can include greater than about 70 mol % C3+ alkanes combined. For example, the second cooling medium 78 can include about 40 mol % to about 60 mol % of C3 and about 30 mol % to about 60 mol % of C4+ alkanes. Preferably, the second cooling medium 78 includes about 50 mol % of C3 and about 50 mol % of C4+ alkanes.

In another embodiment, liquefied natural gas can also serve as a cooling medium. A liquefied natural gas (LNG) stream 80 thus can flow through the non-scraped heat exchangers 32 and 44 and the scraped heat exchanger 66 countercurrently to the gas streams being cooled. As a result, the LNG stream 80 can be re-vaporized by the heat exchangers 32, 44, and 66. If desired, the LNG stream 80 can then be used as fuel in a combustion process such as a gas turbine in a power plant.

Figure 2:
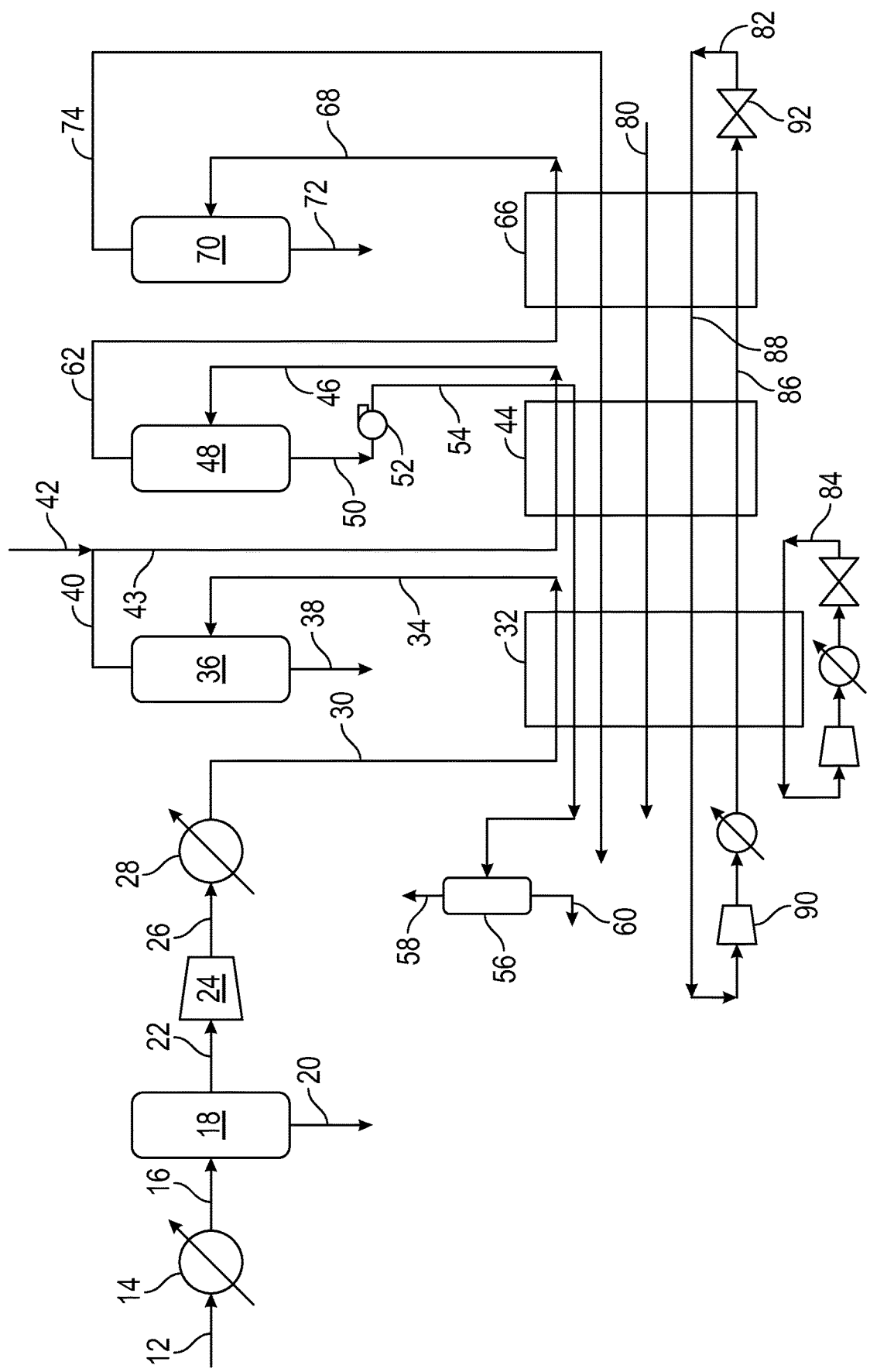
FIG. 2 depicts a flow diagram of an illustrative process for removing $CO_2$ from an exhaust gas using scraped and non-scraped heat exchangers, according to one or more alternative embodiments described herein.

An alternative embodiment to that shown in FIG. 1 is depicted in FIG. 2, which explicitly shows two (dual) refrigeration loops. First, a lower temperature refrigeration loop 82 is fully integrated into the non-scraped heat exchange 32, the at least one other non-scraped heat exchanger 44, and the scraped heat exchanger 66 used for cooling the gas stream. That is, the high-pressure side 86 (i.e., between the compressor 90 and the valve/expander 92 in the flow direction) and the low-pressure side 88 (i.e., between the valve/expander 92 and the compressor 90 in the flow direction) of the loop 82 both pass through the heat exchangers 32, 44, and 66. A first cooling medium flows in the first loop 82. Also, a second cooling medium flows in a second refrigeration loop 84 through the first non-scraped heat exchanger 32. The second refrigeration loop 84 has additional cooling load compared to the first refrigeration loop 84 due to the latent energy required to condense the bulk of the water out of the feed stream 30 Including this second refrigeration loop 84 increases the overall efficiency of the refrigeration. Example cooling mediums may be the same as those described for cooling mediums 76 and 78 of FIG. 1.

In one or more embodiments in which a gas turbine generates the $CO_2$-containing stream that is subjected to the $CO_2$ removal process provided herein, the power generated by the gas turbine can be used to pump the cooling mediums through the heat exchangers. As mentioned previously, the $CO_2$ rich gas stream and any $CO_2$ off-gas generated by the $CO_2$ removal process can also be used to cool the rotating blades of this gas turbine.

Listing of Embodiments

This disclosure may further include any one or more of the following non-limiting embodiments:

Embodiment 1. A process for removing $CO_2$ from a gas, comprising: introducing a gas stream comprising $CO_2$ to a non-scraped heat exchanger to cool the gas stream to a first temperature greater than about 0° C. and less than about 10° C.; introducing an antifreeze agent to the gas stream downstream from the non-scraped heat exchanger to form a mixed stream; introducing the mixed stream to at least one other non-scraped heat exchanger to cool the mixed stream to a second temperature greater than a freezing temperature of the mixed stream, thereby forming a cooled mixed stream, the second temperature optionally being less than 15° C. above the freezing temperature of the mixed stream; and introducing at least a portion of the cooled mixed stream to a scraped heat exchanger to cool the cooled mixed stream to a third temperature below which solid $CO_2$ forms.

Embodiment 2. The process according to Embodiment 1, wherein the non-scraped heat exchanger and the at least one other non-scraped heat exchanger are combined into a single non-scraped heat exchanger or are separate heat exchangers.

Embodiment 3. The process of any of the above embodiments, further comprising, prior to said introducing the gas stream to the non-scraped heat exchanger: introducing the gas stream to at least one cooler to cool the gas stream with air or water to a temperature within 20° C. of ambient temperature and form condensed water in the gas stream; introducing the gas stream to a separator to remove the condensed water from the gas stream; and introducing the gas stream to at least one compressor or blower in series with at least one additional cooler to increase a pressure of the gas.

Embodiment 4. The process of any of the above embodiments, further comprising separating condensed water from the gas stream downstream from the non-scraped heat exchanger, and further comprising separating liquid from the cooled mixed stream downstream from the at least one other non-scraped heat exchanger.

Embodiment 5. The process of any of the above embodiments, wherein the antifreeze agent comprises an alcohol, the alcohol optionally being methanol.

Embodiment 6. The process of any of the above embodiments, wherein an amount of the antifreeze agent added to the gas stream results in about 20 vol % to about 98 vol % of the antifreeze agent in the mixed stream, wherein vol % is based on the total volume of liquid in the mixed stream.

Embodiment 7. The process of any of the above embodiments, wherein said introducing the at least a portion of the cooled mixed stream to the scraped heat exchanger forms a partially frozen mixed stream.

Embodiment 8. The process of Embodiment 7, wherein the process further comprises separating the solid $CO_2$ from the partially frozen mixed stream downstream from the scraped heat exchanger; or wherein the process further comprises heating the solid $CO_2$ to form a $CO_2$ rich fluid stream; or a combination thereof.

Embodiment 9. The process of Embodiment 8, wherein the gas stream is produced by a gas turbine comprising blades that are capable of rotating, and wherein the $CO_2$ rich fluid stream is recycled to the gas turbine for cooling the blades, and wherein power produced by the gas turbine is used to refrigerated and pump a cooling medium through the non-scraped heat exchanger, the at least one other non-scraped heat exchanger, or the scraped heat exchanger.

Embodiment 10. The process of any of the above embodiments, wherein the second temperature ranges from about −95° C. to about −120° C., or wherein the third temperature ranges from about −115° ° C. to about −140° ° C., or a combination thereof.

Embodiment 11. The process of any of the above embodiments, wherein a first cooling medium flows through the non-scraped heat exchanger, the at least one other non-scraped heat exchanger, and the scraped heat exchanger countercurrently to the gas stream, the mixed stream, and the cooled mixed stream, the first cooling medium optionally comprising greater than about 70 mol % of methane (C1), ethane (C2), and $N_2$ combined and greater than about 10 mol % of C4+ alkanes combined; and wherein a second cooling medium flows through the non-scraped heat exchanger countercurrently to the gas stream flowing through the non-scraped heat exchanger, wherein the second cooling medium is warmer than the first cooling medium, the second cooling medium optionally comprising greater than about 70 mol % of (C3) propane and C3+ alkanes combined.

Embodiment 12. The process of any of the above embodiments, wherein liquefied natural gas flows through the non-scraped heat exchanger, the at least one other non-scraped heat exchanger, and the scraped heat exchanger countercurrently to the gas stream, the mixed stream, and the cooled mixed stream, and wherein the liquefied natural gas exiting the non-scraped heat exchanger is introduced to a combustion process.

Embodiment 13. The process of any of the above embodiments, wherein a first cooling medium flows in a first refrigeration loop, wherein the first refrigeration loop comprises a high-pressure side and a low-pressure side, and wherein both the high-pressure side and the low-pressure side pass through the non-scraped heat exchanger, the at least one other non-scraped heat exchanger, and the scraped heat exchanger, the first cooling medium optionally comprising greater than about 70 mol % of methane (C1), ethane (C2), and $N_2$ combined and greater than about 10 mol % of C4+ alkanes combined.

Embodiment 14. The process of any of the above embodiments, wherein a second cooling medium flows in a second refrigeration loop that passes through the non-scraped heat exchanger, and wherein the second cooling medium is warmer than the first cooling medium, the second cooling medium optionally comprising greater than about 70 mol % of propane and C3+ alkanes combined.

Embodiment 15. The process of any of the above embodiments, wherein an amount of water vapor remaining in the gas stream leaving the non-scraped heat exchanger is less than about 5 vol %.

In the claims below, each of the appended claims defines a separate invention, which for infringement purposes is recognized as including equivalents to the various elements or limitations specified in the claims. Depending on the context, all references to the "invention" may in some cases refer to certain specific embodiments only. In other cases, it will be recognized that references to the "invention" will refer to subject matter recited in one or more, but not necessarily all, of the claims. Each of the inventions described above, including specific embodiments, versions and examples, are not limited to these embodiments, versions or examples, which are included to enable a person having ordinary skill in the art to make and use the inventions, when the information in this disclosure is combined with publicly available information and technology.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for removing $CO_2$ from a gas, comprising:
    introducing a gas stream comprising $CO_2$ to a non-scraped heat exchanger to cool the gas stream to a first temperature greater than about 0° C. and less than about 10° C.;
    introducing an antifreeze agent to the gas stream downstream from the non-scraped heat exchanger to form a mixed stream, an amount of the antifreeze agent added to the gas stream resulting in about 20 vol % to about 98 vol % of the antifreeze agent in the mixed stream, wherein vol % is based on the total volume of liquid in the mixed stream;
    introducing the mixed stream to at least one other non-scraped heat exchanger to cool the mixed stream to a second temperature greater than a freezing temperature of the mixed stream, thereby forming a cooled mixed stream; and
    introducing at least a portion of the cooled mixed stream to a scraped heat exchanger to cool the cooled mixed stream to a third temperature below which solid $CO_2$ forms.

2. The process of claim 1, wherein the second temperature is less than about 15° C. above the freezing temperature.

3. The process of claim 1, further comprising, prior to said introducing the gas stream to the non-scraped heat exchanger:
    introducing the gas stream to at least one cooler to cool the gas stream with air or water to a temperature within 20° C. of ambient temperature and form condensed water in the gas stream
    introducing the gas stream to a separator to remove the condensed water from the gas stream; and
    introducing the gas stream to at least one compressor or blower in series with at least one additional cooler to increase a pressure of the gas.

4. The process of claim 1, further comprising separating condensed water from the gas stream downstream from the non-scraped heat exchanger, and further comprising separating liquid from the cooled mixed stream downstream from the at least one other non-scraped heat exchanger.

5. The process of claim 1, wherein the antifreeze agent comprises an alcohol.

6. The process of claim 1, wherein the antifreeze agent comprises methanol.

7. The process of claim 1, wherein said introducing the at least a portion of the cooled mixed stream to the scraped heat exchanger forms a partially frozen mixed stream.

8. The process of claim 7, further comprising separating the solid $CO_2$ from the partially frozen mixed stream downstream from the scraped heat exchanger.

9. The process of claim 8, further comprising heating the solid $CO_2$ to form a $CO_2$ rich fluid stream.

10. The process of claim 9, wherein the gas stream is produced by a gas turbine comprising blades that are capable of rotating, and wherein the $CO_2$2 rich fluid stream is recycled to the gas turbine for cooling the blades.

11. The process of claim 10, wherein power produced by the gas turbine is used to refrigerate and pump a cooling medium through the non-scraped heat exchanger, the at least one other non-scraped heat exchanger, or the scraped heat exchanger.

12. The process of claim 1, i) wherein the second temperature ranges from about −95° ° C. to about −120° C., ii) wherein the third temperature ranges from about −115° C. to about −140° C., or iii) a combination of i) and ii).

13. The process of claim 1, wherein a first cooling medium flows through the non-scraped heat exchanger, the at least one other non-scraped heat exchanger, and the scraped heat exchanger countercurrently to the gas stream, the mixed stream, and the cooled mixed stream; and wherein a second cooling medium flows through the non-scraped heat exchanger countercurrently to the gas stream flowing through the non-scraped heat exchanger, wherein the second cooling medium is warmer than the first cooling medium.

14. The process of claim 1, wherein liquefied natural gas flows through the non-scraped heat exchanger, the at least one other non-scraped heat exchanger, and the scraped heat exchanger countercurrently to the gas stream, the mixed stream, and the cooled mixed stream, and wherein the liquefied natural gas exiting the non-scraped heat exchanger is introduced to a combustion process.

15. The process of claim 1, wherein a first cooling medium flows in a first refrigeration loop, wherein the first refrigeration loop comprises a high-pressure side and a low-pressure side, and wherein both the high-pressure side and the low-pressure side pass through the non-scraped heat exchanger, the at least one other non-scraped heat exchanger, and the scraped heat exchanger.

16. The process of claim 15, wherein a second cooling medium flows in a second refrigeration loop that passes through the non-scraped heat exchanger, and wherein the second cooling medium is warmer than the first cooling medium.

17. The process of claim 16, wherein the first cooling medium comprises greater than about 70 mol % of methane (C1), ethane (C2), and $N_2$ combined and greater than about 10 mol % of $C4_+$ alkanes combined, and wherein the second cooling medium comprises greater than about 70 mol % of propane and $C3_+$ alkanes combined.

18. The process of claim 1, wherein an amount of water vapor remaining in the gas stream leaving the non-scraped heat exchanger is less than about 5 vol %.

19. A process for removing $CO_2$ from a gas, comprising:
    introducing a gas stream comprising $CO_2$ to a non-scraped heat exchanger to cool the gas stream to a first temperature greater than about 0° C. and less than about 10° C.;
    introducing an antifreeze agent to the gas stream downstream from the non-scraped heat exchanger to form a mixed stream;

introducing the mixed stream to at least one other non-scraped heat exchanger to cool the mixed stream to a second temperature greater than a freezing temperature of the mixed stream, thereby forming a cooled mixed stream;
introducing at least a portion of the cooled mixed stream to a scraped heat exchanger to cool the cooled mixed stream to a third temperature below which solid $CO_2$ forms, the introducing forming a partially frozen mixed stream comprising solid $CO_2$;
separating the solid $CO_2$ from the partially frozen mixed stream downstream from the scraped heat exchanger; and
heating the solid $CO_2$ to form a $CO_2$ rich fluid stream.

* * * * *